F. Wittram,
Anchor.
No. 3137. Reissued. Sept. 22. 1868.
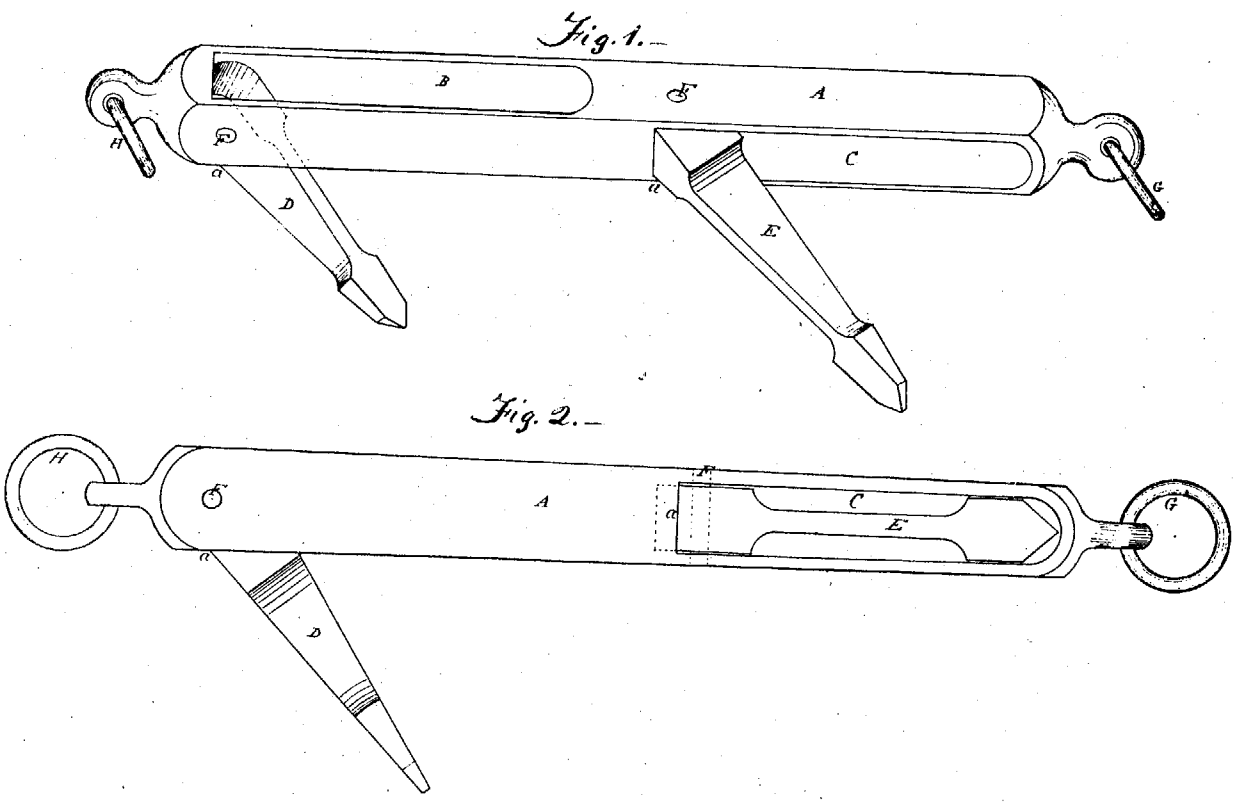
Witnesses:
Wm. Dennis
Wm. H. Seamans
Frederick Wittram
By his Atty J. Dennis Jr.

UNITED STATES PATENT OFFICE.

FREDERICK WITTRAM, OF SAN FRANCISCO, CALIFORNIA.

IMPROVEMENT IN ANCHORS.

Specification forming part of Letters Patent No. 78,852, dated June 9, 1868; Reissue No. 3,137, dated September 22, 1868.

*To all whom it may concern:*

Be it known that I, FREDERICK WITTRAM, of the city and county of San Francisco, State of California, have invented an Improved Anchor; and I do hereby declare that the following description and accompanying drawings are sufficient to enable any person skilled in the art or science to which it most nearly appertains to make and use my said invention or improvement without further invention or experiment.

My invention relates to an improvement in anchors for steamers, ships, boats, and other vessels; and has for its object the construction of an anchor which shall be cheap and useful, and may be easily stowed, and made to occupy but small space when not in use; and, finally, by its peculiar construction, in whatever way it may fall on the ground or bottom, one or both arms or flukes will immediately take and hold. This is accomplished by placing the arms or flukes in openings in the shank at different portions of its length, and at right angle to each other, so that the arms or flukes may swing out on either side by gravitation as the anchor falls, while, when not in use, they lie within the body of the shank.

To more fully explain my invention reference is had to the accompanying drawings, forming a part of this specification, of which—

Figure 1 is a perspective view of my anchor. Fig. 2 is a side elevation.

Similar letters of reference in each of the figures indicate like parts.

A is the shank of an anchor of my construction, which may be made of suitable form, and of a length sufficient to give room for the openings and their respective arms or flukes. These openings are made through the shank—one, B, at the bottom or lower portion of the shank, and extending to near the center thereof, while the other, C, is made in a plane at right angles with the first opening, and extending from near the center to the upper end or portion of the shank.

The arms or flukes D and E are made of suitable form for strength and convenience, as shown, and turn easily on strong axles F, so placed that when the arm or fluke has moved out to a proper distance it rests against a shoulder formed by the edge of the opening in the shank, as shown at *a*; or a lug may be placed or forged at that point on the shank or arm, if desired, against which it shall rest.

The chain or cable is bent or fastened to the ring G, and if the anchor falls in the position shown at Fig. 1 it will insure both arms or flukes taking ground, while if it falls as in Fig. 2 the arm or fluke D will hold.

As there are no projections, such as the stock or the unused arm or fluke of ordinary anchors, there will be no danger of fouling as the vessel or ship moves or swings with the tide or by other means, and when the anchor is not in use the arms or flukes lie within the shank out of the way; or the whole may be hung up by the ring H at the bottom of the anchor, so that the anchor is at once compact and ready for service. Its use will be more advantageous, and its cost much less than ordinary anchors.

Now, what I claim as new, and as my invention, and desire to secure by Letters Patent, is—

1. Openings made lengthwise in the shank of an anchor, through which arms or flukes move freely to either side, substantially as herein described.

2. The placing of two or more jointed arms or flukes at different portions of the shank's length, at or about at right angles to each other.

In witness whereof I have hereunto set my hand and seal.

FREDERICK WITTRAM. [L. S.]

Witnesses:
J. L. BOONE,
C. W. M. SMITH.